(12) United States Patent
Box et al.

(10) Patent No.: US 8,619,369 B2
(45) Date of Patent: Dec. 31, 2013

(54) DISPLAY DEVICE, NOTABLY FOR A MOTOR VEHICLE

(75) Inventors: Benoit Box, Parmain (FR); Jean-Luc Croy, Limeil Brevannes (FR); Sebastien Hervy, La Garenne Colombes (FR); Pierre Bascoul, Cergy (FR); Philippe Fedorawiez, Triel sur Seine (FR); Giany Pitte, Osny (FR); Olivier Luneau, Auvers sur Oise (FR); Georges Prigent, Le Mans (FR); Pascal Choquart, Cergy Saint Christophe (FR)

(73) Assignee: Johnson Controls Technology Company, Holland, MI (US)

( * ) Notice: Subject to any disclaimer, the term of this patent is extended or adjusted under 35 U.S.C. 154(b) by 237 days.

(21) Appl. No.: 12/944,278

(22) Filed: Nov. 11, 2010

(65) Prior Publication Data
US 2011/0141572 A1 Jun. 16, 2011

(30) Foreign Application Priority Data

Nov. 12, 2009 (DE) .......................... 10 2009 053 023
Nov. 3, 2010 (EP) ..................................... 10014241

(51) Int. Cl.
*G02B 27/01* (2006.01)
(52) U.S. Cl.
USPC ........................................................ 359/632

(58) Field of Classification Search
USPC ...................... 359/13, 14, 630–634; 345/7–9; 348/115; 349/11
See application file for complete search history.

(56) References Cited

U.S. PATENT DOCUMENTS

| 5,214,413 A | 5/1993 | Okabayashi et al. | |
| 2006/0203351 A1* | 9/2006 | Kageyama et al. | 359/630 |
| 2008/0266389 A1* | 10/2008 | DeWind et al. | 348/115 |

FOREIGN PATENT DOCUMENTS

JP 2007182132 7/2007

OTHER PUBLICATIONS

European Patent Office Search Report mailed Apr. 13, 2011.

* cited by examiner

*Primary Examiner* — Joseph P Martinez
(74) *Attorney, Agent, or Firm* — Fletcher Yoder P.C.

(57) ABSTRACT

The present invention relates to a display device, notably for a motor vehicle, comprising a projection module for generating an image for the purpose of a projection in the normal direction of looking of a user of the display device on an optical path, the display device comprising a reflection element, the reflection element being capable of being moved between a multitude of different display positions, the different display positions corresponding to different viewing positions of a user of the display device.

6 Claims, 7 Drawing Sheets

Figure 1:
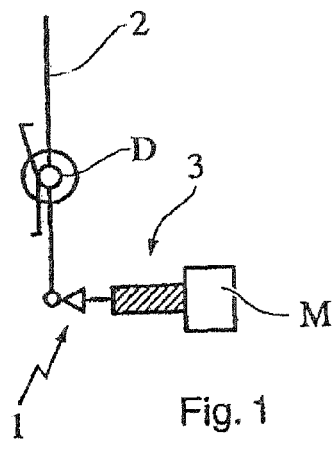

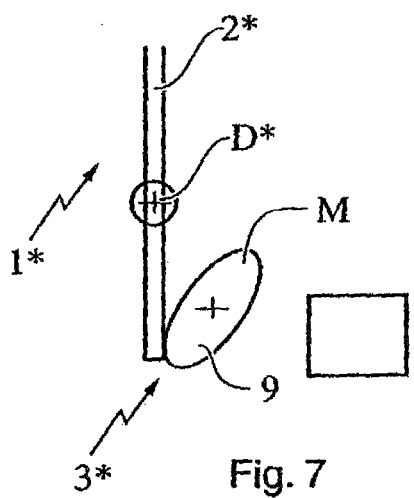
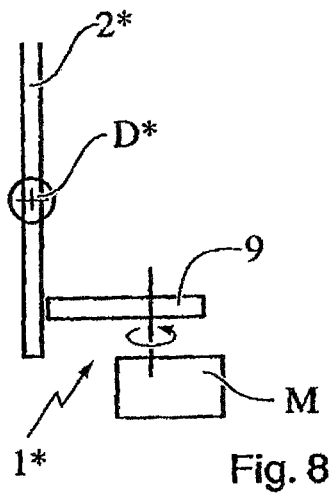
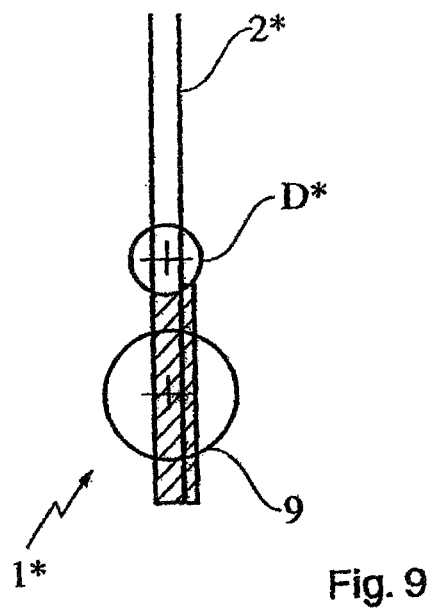

DISPLAY DEVICE, NOTABLY FOR A MOTOR VEHICLE

CROSS REFERENCE TO RELATED APPLICATIONS

This application claims priority from and the benefit of German Patent No. DE 10 2009 053 023.1, filed on Nov. 12, 2009 and European Application No. EP 10014241, filed on Nov. 3, 2010; all entitled "Display Device, Notably for a Motor Vehicle", which are herein incorporated by reference.

BACKGROUND

The present invention relates to a display device, notably for a motor vehicle.

Display devices of the head up display type (HUD) are known, notably with the projection of an image toward a windshield as described in document U.S. Pat. No. 5,214,413 or toward a reflection element.

Head up display devices make it possible to project information in the field of view of the space in front of the motor vehicle so that the driver of the motor vehicle can read this information without taking his eyes off the space in front of the motor vehicle. At the same time, the information can be read without changing the focus of the eyes of the driver of the vehicle.

It is advantageous that—depending on the needs of a user of the vehicle—the reflection element can either be used in several positions of the head (or of the eyes) of the user of the vehicle.

A drawback of such devices according to the prior art consists in the fact that the change of position of the reflection element is not provided for as a function of a different height (of the position of the head) of the user.

SUMMARY

The main object of the present invention is to alleviate the drawbacks of the prior art and notably those cited above, and also to propose a head up display device having a reflection element that can be adjusted so as to be adaptable to different head heights of the user, the display device comprising a mechanism having great stability and long service life despite frequent use.

According to the present invention, this object is achieved by a display device, notably for a motor vehicle, comprising a projection module for generating an image for the purpose of a projection in the normal direction of looking of a user of the display device on an optical path, wherein the display device comprises a reflection element, the reflection element being capable of being moved between a multitude of different display positions, the different display positions corresponding to different viewing positions of a user of the display device.

Through such an embodiment of a display device, it is advantageously possible to produce the mechanism for moving the reflection element in a simple and stable manner.

Another preferred enhancement of the invention lies in the fact that the reflection element is capable of being positioned, in addition to the multitude of different display positions, in a rest position, the reflection element in its different display positions being provided in the normal direction of looking of the user, and that, when the reflection element is moved between its rest position and one of its different display positions, the reflection element is subjected to a translational movement.

Through such an embodiment of a display device, it is advantageously possible to eliminate or at least reduce the risk of damaging the reflection element when the latter is in its first rest position.

Another preferred enhancement of the invention lies in the fact that the display device comprises a means for covering the reflection element, the cover means covering the reflection element when the latter is positioned in its rest position.

Through such an embodiment of a display device, it is advantageously possible to eliminate or at least yet further reduce the risk of damaging the reflection element when the latter is in its first rest position.

A particularly preferred enhancement of the invention lies in the fact that, between the different display positions of the reflection element, the reflection element is subjected to a rotary movement about a fixed axis of rotation.

Through such an embodiment of a display device, it is advantageously possible to provide for the movement of the reflection element in a simple and mechanically stable manner.

According to a variant of the present invention, it is also preferred that the reflection element is rotated about the axis of rotation by means of a rotary motor element and by means of a transmission element.

Another preferred enhancement of the invention lies in the fact that the reflection element is rotated about the axis of rotation by means of a linear motor element and by means of a transmission element.

A preferred enhancement of the invention lies in the fact that the axis of rotation of the reflection element is a physical axis.

Other features and advantages of the invention will emerge from reading the following description of a particular non-limiting embodiment of the present invention.

DRAWINGS

Figure 2:
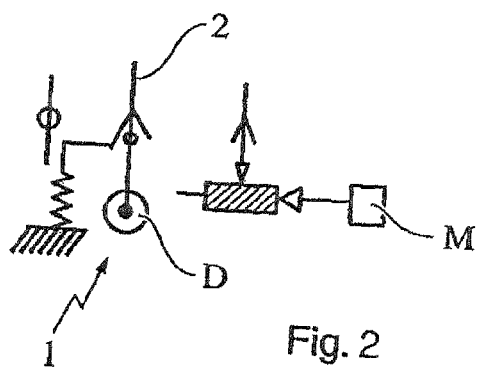
Figure 3:
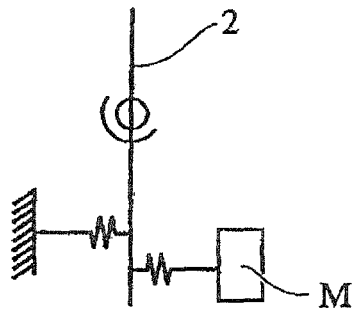
Figure 4:
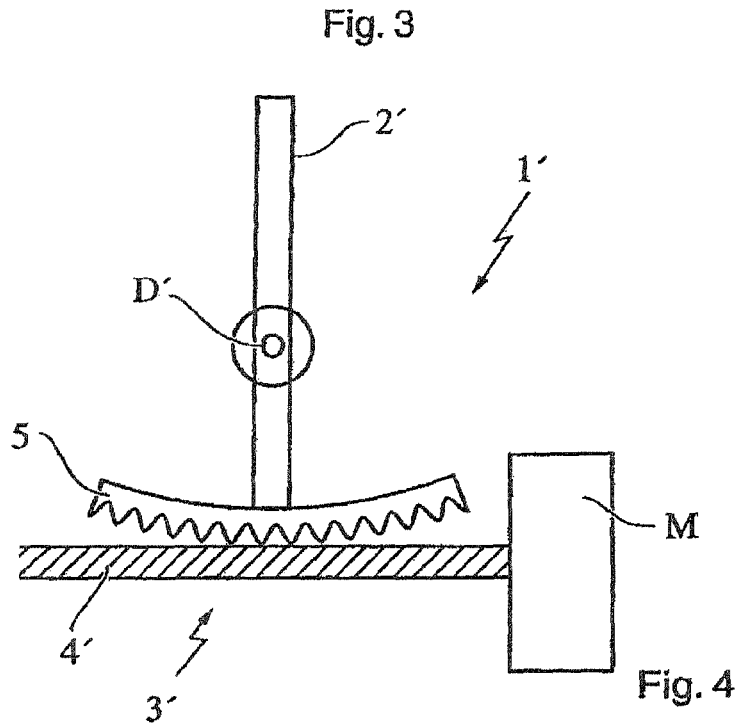
Figure 5:
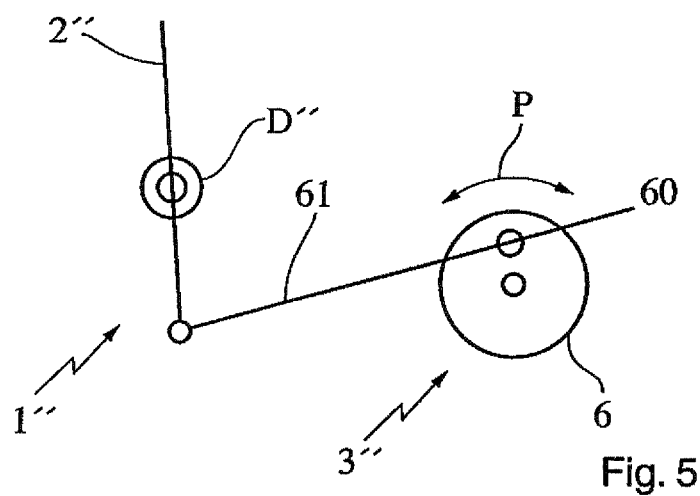
Figure 6:
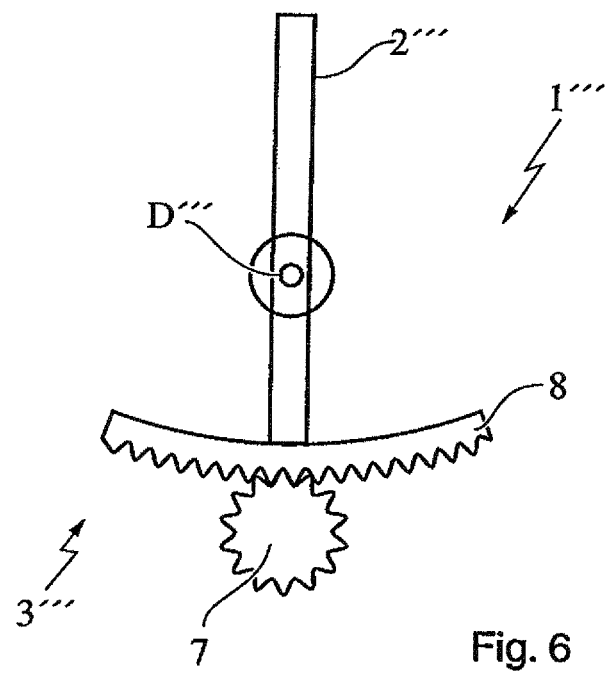

The invention will be better understood by virtue of the following description which relates to preferred embodiments given as nonlimiting examples and explained with reference to the appended schematic drawings, in which:

FIGS. 1 to 3 are schematic views of a reflection element of a display device according to a first variant of the present invention, FIG. 4 is a schematic view of a reflection element of a display device according to a second variant of the present invention, FIG. 5 is a schematic view of a reflection element of a display device according to a third variant of the present invention, FIG. 6 is a schematic view of a reflection element of a display device according to a fourth variant of the present invention, FIGS. 7 to 9 and 15 to 17 are schematic views of a reflection element of a display device according to a fifth variant of the present invention, 10 and 11 are schematic views of a reflection element of a display device according to a sixth variant of the present invention, 12 to 14 are schematic views of mechanisms for achieving a movement of the reflection element of a display device according to the present invention, and 18 is a schematic view in section of a display device according to the present invention.

DETAILED DESCRIPTION

Figure 18:
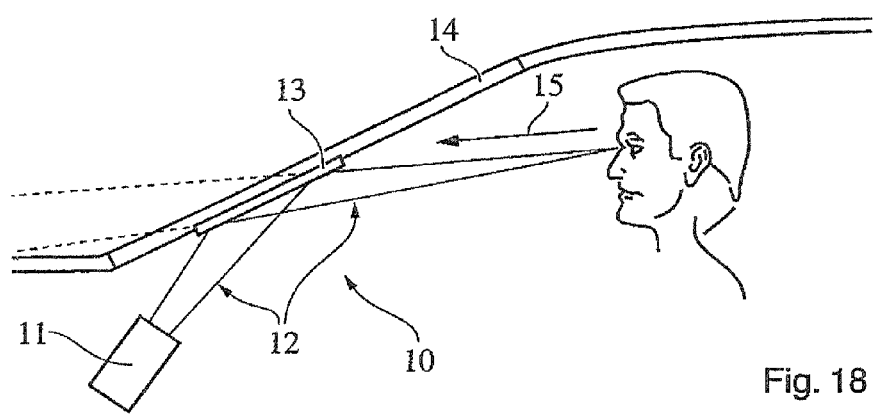

As shown in FIG. 18 of the appended drawing, a display device 10 according to the present invention comprises a projection module 11 which generates an image in the normal direction of looking 15 of a user of the display device 10 on an optical path 12.

The optical path 12 normally comprises at least one reflection element 13. In this manner, the optical path 12 may comprise a (single) reflection element, as shown in FIG. 18. Moreover, the optical path 12 may also comprise two reflection elements. The display device 10 may also comprise—in another variant not shown in the figures—more than two reflection elements 13.

The normal direction of looking 15 is the viewing direction of a user of the display device 10, notably a vehicle driver, when the latter looks, notably through a windshield 14, at the outside which is in front of the vehicle.

According to the present invention, the reflection element 13 is an element positioned away from the windshield 14. According to a preferred embodiment of the present invention, the reflection element 13 may be positioned in a rest position and in a display position. When the reflection element 13 is positioned in its rest position, the reflection element 13 is for example oriented in a virtually horizontal manner, and when the reflection element 13 is positioned in its display position, the reflection element 13 is typically positioned upright or virtually vertically so that the user of the display device can look through the reflection element 13. Nevertheless, it is also possible and preferred according to the present invention that, when the reflection element 13 is positioned in its rest position, the reflection element 13 is oriented in a virtually vertical manner and that the change of position of the rest position and of the display position of the reflection element 13 takes place through a translational movement.

In the description of the appended figures, the reflection element 13 is also called a strip or "blade" and is indicated by references **2, 2', 2", 2''', 2\*, 2\*\*, 2\*\*\*. According to all the variants of the reflection element 13**, the latter is capable of being positioned in different positions about an axis of rotation, D, D', D", D''', D\*, D\*\*, D\*\*\*. The different positions of the reflection element 13 correspond to display positions and are suitable for different head heights of the user. This means that the total angle of variation of the reflection element 13 between the different display positions is in a relatively small range of a few degrees or of approximately ten or approximately fifteen degrees, notably from 2° to 20°, preferably from 4° to 10°. The reflection element 13 is driven by a motor element M, either directly or through a transmission element **3, 3', 3", 3''', 3\*, 3\*\*, 3\*\*\***. The motor element M may be a linear motor element or a rotary motor element, notably an electric stepping motor element.

The change of position of the reflection element 13 can be carried out by voice activation, that is to say through an acoustic signal. For this purpose, the display device may comprise or be associated with a voice recognition device. When such a voice recognition device recognizes a certain driver (or user) of the vehicle, the reflection element 13 may be positioned in the ideal display position for this driver with the aid of stored positions.

According to a first variant of the present invention, shown in FIGS. 1 to 3, the reflection element 2 of the display device 10 is capable of being subjected to a rotary movement about the axis of rotation D by the motor element, the motor element M being a linear motor element or a rotary motor element operating with a transmission element of the worm transmission type.

According to a second variant of the present invention, shown in FIG. 4, the reflection element 2' of the display device 10 is capable of being subjected to a rotary movement about the axis of rotation D' by the motor element, the motor element M being a rotary motor element operating with a transmission element of the worm transmission type 4'. About the axis of rotation D', the reflection element 2' (or strip 2') comprises a sector of a toothed element 5 matching the worm element 4'.

According to a fourth variant of the present invention, shown in FIG. 6, the reflection element 2''' of the display device 10 is capable of being subjected to a rotary movement about the axis of rotation D''' by the motor element, the motor element being a rotary motor element operating with a transmission element of the gear wheel type 7. About the axis of rotation D''', the reflection element 2''' (or strip 2''') comprises a sector of a toothed element 3''' matching the toothed gear wheel 7.

According to a third variant of the present invention, shown in FIG. 5, the reflection element 2" of the display device 10 is capable of being subjected to a rotary movement about the axis of rotation D" by the motor element, the motor element being a rotary motor element operating with a transmission element of the crank type (with a disk 6) with a crank pin 60 and a link rod 61. The link rod 61 is—for example—coupled to one end of the reflection element 2" (away from the axis of rotation D").

According to a fifth variant of the present invention, shown in FIGS. 7 to 9 and 15 to 17, the reflection element 2\* of the display device 10 is capable of being subjected to a rotary movement about the axis of rotation D\* by the motor element, the motor element M being a rotary motor element operating with a transmission element of the cam type 9 or runner, the cam being capable of being rotated about an axis of rotation (different from the axis of rotation D\* of the reflection element 2\*). According to the variant of FIG. 7, the axis of rotation D\* and the axis of rotation of the cam are designed to be parallel. According to the variant of FIG. 8, the axis of rotation D\* and the axis of rotation of the cam are designed to be at right angles. According to the variant of FIG. 9, the axis of rotation D\* and the axis of rotation of the motor element are designed to be parallel and a runner works in the reflection element 13.

Figure 10:
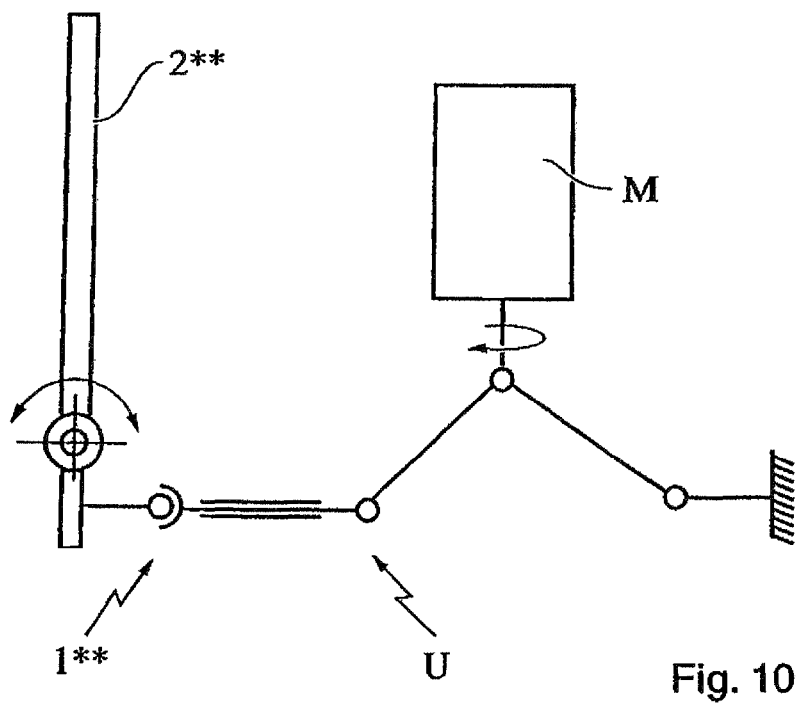
Figure 11:
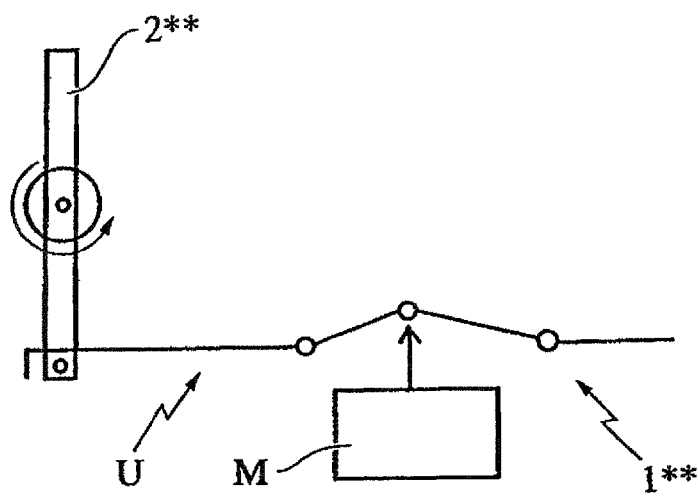

According to a sixth variant of the present invention, shown in FIGS. 10 and 11, the reflection element **2\*\* of the display device 10** is capable of being subjected to a rotary movement about the axis of rotation D\*\* by the motor element, the motor element M being a linear motor element (FIG. 11) or a rotary motor element (FIG. 10), the motor element producing a movement that is linear and transmitted through a U diversion pulley mechanism.

According to a seventh variant (not shown in the figures) of the present invention, the reflection element 13 is designed so as to be capable of being positioned in a rest position and a display position via a magnetic mechanism. Such a mechanism comprises a magnetic element and an element capable of producing a magnetic force so as to drive the reflection element 13. The magnetic element may—for example—be a permanent magnet. The attachment or fastening between the reflection element 13 and the magnetic element may—for example—be achieved via a sleeve fitting, a clip fitting or by a molding fitting.

According to an eighth variant (not shown in the figures) of the present invention, a cylindrical element is used to achieve the movement of the reflection element 13. The cylindrical element may—for example—be an electric cylindrical element the movement of which is directly or indirectly (that is to say by a transmission element) transmitted to the reflection element 13.

Figure 13:
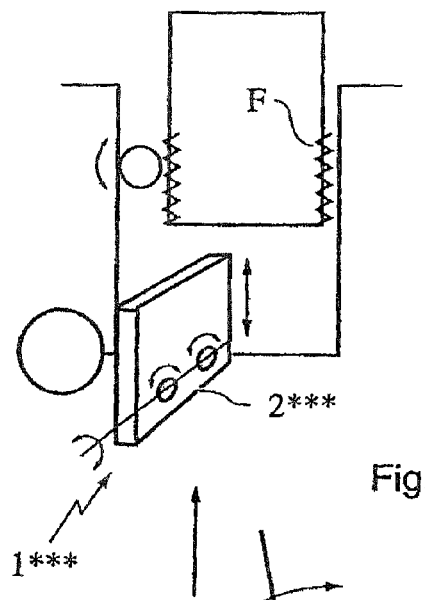
Figure 12:
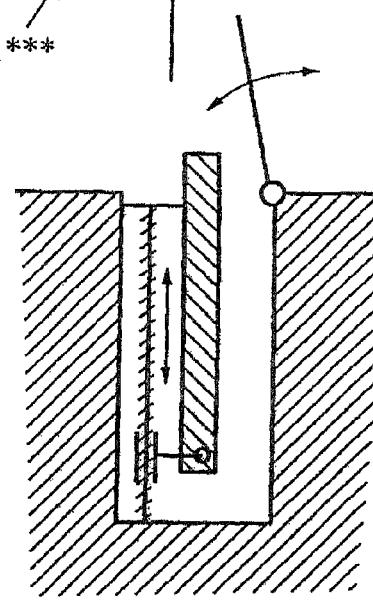
Figure 14:
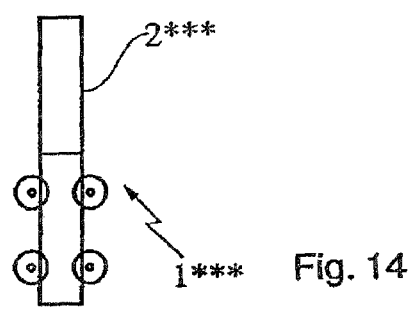
Figure 15:
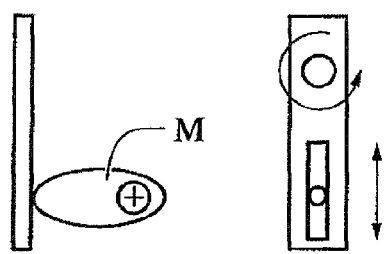
Figure 16:
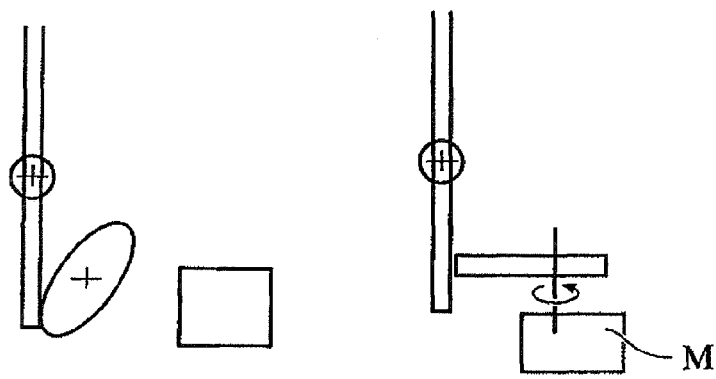
Figure 17:
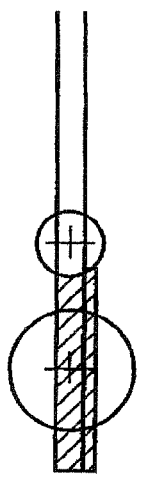

The mechanisms shown in FIGS. 12, 13 and 14 are designed to achieve a vertical movement of the reflection element 2*. The reflection element 2* comprises at least one guide element F which is designed to interact with a transmission element in order to transmit the drive movement of the motor element so as to achieve the vertical movement of the reflection element 2***. The guide element F is—for example—designed to be a notched bar. In this case, the transmission element is—for example—designed as a gear wheel. The guide element F is—for example—designed as a runner or rail. The transmission element is—for example—designed as a roller.

LIST OF REFERENCES 10 display device
11 projection module
12 optical path
13 reflection element
14 windshield
15 normal direction of looking

The invention claimed is:

1. A head up display device for a motor vehicle, comprising a projection module for generating an image for projection in the normal direction of looking of a user of the head up display device on an optical path, wherein the head up display device comprises a reflection element, the normal direction of looking substantially corresponds to a viewing direction of the user through the reflection element toward a space in front of the motor vehicle, the reflection element being capable of being moved between a multitude of different display positions, the different display positions corresponding to different viewing positions of a user of the head up display device, wherein the reflection element is capable of being positioned, in addition to the multitude of different display positions, in a rest position, the reflection element in its different display positions being provided in the normal direction of looking of the user, and wherein, when the reflection element is moved between its rest position and one of its different display positions, the reflection element is subjected to a translational movement.

2. The head up display device as claimed claim 1, wherein the head up display device comprises a means for covering the reflection element, the cover means covering the reflection element when the reflection element is positioned in its rest position.

3. The head up display device as claimed in claim 1, wherein, between the different display positions of the reflection element, the reflection element is subjected to a rotary movement about a fixed axis of rotation.

4. The head up display device as claimed in claim 3, wherein the reflection element is rotated about the axis of rotation by a rotary motor element and by a transmission element.

5. The head up display device as claimed in claim 3, wherein the reflection element is rotated about the axis of rotation by a linear motor element and by a transmission element.

6. The head up display device as claimed in claim 3, wherein the axis of rotation of the reflection element is a physical axis.

* * * * *